United States Patent Office 2,952,543
Patented Sept. 13, 1960

2,952,543

PROTEIN FOOD PRODUCT AND PROCESS

Alina S. Szczesniak, Yonkers, and Eric Engel, Levittown, N.Y., assignors to General Foods Corporation, White Plains, N.Y., a corporation of Delaware No Drawing. Filed Aug. 26, 1958, Ser. No. 757,210

7 Claims. (Cl. 99—14)

This invention relates to an improvement in the art of producing food products high in protein and containing edible protein fibers. More particularly the invention is concerned with improvements in the art of manufacturing protein fibers for use in the production of meat-like products simulating the eating quality of mammals as well as the flesh of fish, fowl, shellfish and the like.

Heretofore food technologists have borrowed from the artificial textile fiber technology in the production of edible "man-made" protein fibers from vegetable protein such as soy, corn, peanut protein as well as animal protein such as casein and keratin. These protein fibers are prepared by the creation of a spinning dope of protein which is then extruded to produce filaments which filaments are coagulated to produce protein fibers. Thereafter the protein fibers are rinsed and compounded into a variety of food products by the use of various binders or they may be assembled into aggregates of fibers which aggregates or tows are then assembled by the use of suitable binders. It is stated in the prior art that such aggregates of protein fibers may take the form of more recognizable meats such as chops, steaks, hams and the like.

However, it has been experienced in carrying out the teachings of the prior art that some protein fibers produced by borrowing from the man-made textile fiber art suffer from a number of disadvantages. In the first place, it has been generally observed that some of these fibers, after their assembly into the meat-like product, cannot withstand cooking. For example, in the case of casein fibers produced by the aforesaid spinning technique, it will be observed that the casein fibers disintegrate with loss of fibrous texture upon heating in water, or that the wet fibers will simply melt upon heating. In the case of vegetable proteins such as soy protein, the protein has to be isolated from the soy bean in order to be useable in a spinning dope. Many grades of marketed soy protein have not been found useful in the foregoing spinning approach in view of the denaturation of the protein which takes place in the processing of the soy bean. Soy protein isolated from soy bean in a useable substantially undenatured form and spun into protein fibers, although not suffering the foregoing disintegration on heating, does not exhibit the tensile strength of casein fibers; and the products compounded therefrom in turn do not exhibit as desirable a textural and eating quality as do those produced from casein fibers. Accordingly, although soy protein fibers can be compounded with other ingredients such as fat and edible binders to produce a meat-like product and will not disintegrate to any great extent upon heating, the meat-like product compounded from such fibers leaves much to be desired in terms of chewability and appearance.

It would be desirable to be able to employ in combination soy protein and casein such that the fiber strength of casein fibers can be fully utilized while at the same time utilizing the stability of soy protein fibers for use in hot dishes.

In accordance with the present invention a procedure has been found which enables the use of relatively inexpensive commercially available sources of soy protein wherein the protein is in substantially undenatured condition, e.g., de-fatted soy flour. By "soy flour" is meant that by-product in the soy bean oil extraction process which involves crushing native soy bean, expelling the oil therefrom, removing residual oil by solvent extraction and then grinding the residue. Although it is preferred for the present purposes to employ soy bean flour, other sources of soy protein in undenatured form can be employed, to wit, non-de-fatted soy meal, the residue of the aqueous extraction of acidified soy bean meal to provide so-called "protein-enriched soy flour," and the like.

The process of the present invention comprises preparing an acidic casein aqueous dispersion having a pH of 5.3–5.8; preparing an alkaline dispersion of essentially undenatured soy protein having a pH of 11–11.5; blending the casein and soy protein dspersions to provide a pH in the neighborhood of 8.5–9.3 whereat the dope solution can be of such viscosity and tackiness that it can be readily spun into filaments the protein of which may thereafter be precipitated in an acid bath in order to produce a protein fiber having a uniform texture throughout its cross-section and hence characterized by a freedom from either alkaline or acid centers as well as a freedom from an overly dense or firm curd skin around the fiber.

In the following the procedure of the present invention it is important to adhere to certain critical conditions which should be observed if a protein filament of suitable spinnability and a protein fiber of suitable eating quality as well as improved hydrating characteristics is to be obtained. By initially providing a casein dispersion or dope moiety having an acidic pH in the neighborhood of 5.3–5.8 the casein dispersion is provided with such acidity as to allow its being blended with a cooperating soy dispersion or dope moiety at a high alkaline pH such that the blends of these moieties provide a spinning dope solution having maximal spinning properties. By adjusting the pH of the soy protein dispersion or moiety to a highly alkaline pH it is modified to a condition such that it can be utilized in a protein spinning solution as well as in the final protein fiber produced therefrom to the fullest advantage, the excess of alkali required for the high pH being utilized for adjusting the pH of the casein dispersion or dope moiety to a pH at which it displays optimal spinnability and upon acid precipitation desired textural eating qualities as well as rehydration characteristics. In blending the dope moieties specified hereinabove a certain ratio between the moieties should be observed. It has been found that, for the foregoing specified preferred pH's for dope moieties, the moieties may be blended at equal parts by weight to provide a dope solution of maximal spinnability and result in a protein fiber of acceptable eating quality. For the purposes of the present invention it has been found that the optimal range of ratios of soy to casein dope moieties range between 40:60 and 60:40 parts by weight. In following the foregoing relationships between soy and casein dope moieties the alkalinity of the separate moieties is automatically adjusted so as to provide a spinning dope when the moieties are blended having a pH generally in the range of 8.5–9.3 for maximal spinnability. Although the foregoing ratios are preferred it is to be understood that the invention should not be restricted thereto since improved results over those of the prior art can be obtained when even higher proportions of casein than those specified hereinabove are employed; it is preferred not to employ any higher proportion of casein than 80% since at such a high level the thermal-stability as well as the chewability of the composite protein fiber spun therefrom is adversely affected; furthermore, the hydration characteristics of the composite protein fiber is also reduced in that it provides a drier mouth feel and less of a meat-like characteristic when the product is eaten. On the other hand, when too high a proportion of soy moiety is employed the ability of the dope to be spun into the proper filament and resulting protein fiber is correspondingly reduced, due to the increase in the non-proteinaceous matter contained in the soy digest as well as the reduction in the protein contribution to the over-all protein fiber.

In spinning the foregoing composite protein dope solution core must be exercised in order that the over-all pH resulting from blending of the alkaline soy moiety and the acid casein moiety does not go beyond the bounds of maximal spinnability. When a pH substantially above 9.3 is practiced there is a reduction in dope viscosity and a loss in tackiness such that the filaments when spun suffer from a loss in drawability or stretchability. Furthermore, at such a high pH, higher acid concentrations in the acid precipitation bath are required such that the filament when deposited in the precipitating bath is not uniformly precipitated due to the formation of an outer skin or curd layer which interferes with the penetration of the precipitating reagent; furthermore, due to this interfering outer curd or outer skin there is a liquid center resulting which has a relatively poor fiber strength such that when eaten the fiber does not offer the resistance to mastication required for satisfaction in eating the food product compounded from such fibers. Furthermore, there remains an alkali taste in the center of the fiber which is relatively difficult to wash away. It is not possible to compensate for such disadvantages simply by using an abundance of acid since such acid creates an extremely hard outer skin with the soft center characteristic still prevailing due to the dense firm curd layer interfering again with the passage of acid to the inside or center of the filament being spun. Here also, due to the residual acidity occluded in this dense outer curd layer, residual quantities of acidity are difficult to remove and are objectionable to the taste.

Where the pH of the eventual composite spinning dope is too low (say below a pH of 8.0) the viscosity of the dope is increased to the point of gelation such that it is difficult to spin. As a consequence of low pH, the protein will not hydrate completely such that in spinning the protein will not orient and as a consequence will result in a weak or brittle fiber upon acid precipitation with a corresponding low tensile strength.

Thus, by adhering to the foregoing conditions, it is possible to spin the composite soy-casein dope into a filament which can be uniformly acid precipitated to yield a protein fiber having highly improved textural characteristics as well as hydration characteristics. The protein fiber formed upon precipitation can be dried to a moisture content of less than 10% and to as low as 3% and can be rehydrated in any compounded meat-like product in the presence of other modifying ingredients such as fat, starches, flavoring agents and the like to resemble meat fibers having satisfactory tensile strength and substance as manifested by the mastication required to disintegrate the fibers. In addition, the fibers are notable for their heat stability since they can be formulated with the foregoing modifying fats, starches, gums and like ingredients into most readily cookable forms and will not disintegrate on boiling in water, baking in an oven at temperatures up to 450° F., or deep fat frying up to temperatures of 450° F.

As distinguished from the case where protein fibers are produced from casein dopes and which have a very brittle character and poor rehydration characteristics the soy present in combination with the casein serves as a plasticizing or softening matrix for the more brittle casein fraction of the protein filament and masks the more unnatural artificial character ordinarily contributed by casein to the filament. These product advantages are noted when such modifying agents as fats, starches, gums (like algin, pectin) and the like are incorporated into the spinning dope prior to formation of the filaments and acid precipitation thereof but also display these improved eating qualities and rehydration characteristics when such modifying agents are added to the fibers after they are formed.

The composite protein dope can be spun into filaments having a variety of cross-sections and sizes and using a spinnerette or other equipment capable of extruding the dope through an orifice which may range in size from 0.003 inch to 0.020 inch or even higher, the size of the orifice determining the size of the filament which in turn is dictated by meat product being imitated and the textural characteristics being desired.

The mechanism for spinning will occur to the man skilled in the art and in general should be such as to provide a suitably handled tacky filament which can be deposited into an edible acid precipitating bath capable of forming the foregoing composite protein fibers. Acids which may be employed are lactic acid, acidic acid, citric acid or any other of the edible oxy-acids as well as hydrochloric acid. After acid precipitation the fibers are rinsed of residual excess acidity, excess water is removed by suitable mechanical squeezing or centrifugation which is followed by drying. The fibers are then in condition to be immersed in a suitable batter or binding solution for subsequent compounding into the meat-like food products referred to hereinafter. In carrying out acid precipitation it is generally found that the composite protein fiber can be precipitated at a pH in the order of 2.0–3.5 although still higher pH's may be practiced. The excess acidity is of course removed by resorting to a rinse in a salt solution such as sodium chloride. By continued rinsing cycles the protein filament is eventually reduced to the desired form for further use in compounding.

The fibers produced by acid precipitation at a pH in the order of 2.0–3.0 possess sufficient toughness or chewiness such that the eating quality of the eventual food product can be modified simply by proper selection of the binding or modifying agent to be externally applied. On the other hand, it is possible to modify the toughness or chewiness of the composite protein fiber by adjusting the acid concentration of the bath downwardly or upwardly from the foregoing preferred range whichever may be desired. As the pH is adjusted upwardly the fibers produced are softer; as the pH is reduced downwardly the fibers are somewhat tougher. In addition, using heat in the rinse with salt solution increases the toughness of the fibers. Furthermore, the rehydration characteristics as well as the eating qualities of the characteristics can be modified by the manner in which the fibers are dehydrated; hence, when the fibers are dehydrated by vacuum drying or some other mild dehydration operation there is virtually no change in the rehydration as well as the texture characteristics of the product; on the other hand when heat is employed during the dehydration process the protein filaments are modified to the extent that the rehydration characteristics are reduced and the resulting product is tougher than before dehydration; in some cases this may be desired.

The fibers can be comminuted and provided with a suitable carrying vehicle to provide a meat-like spread or the fibers can be used intact by aggregation into the form of tows which tows can be then encased by the use of suitable binders or can be enwrapped by an edible casing or sausage treatment. Further treatment of the composites of the fibers can also be employed such that composites of tows of the fibers of the present invention can be deep fat fried to yield a crustaceous enwrapment which stabilizes the meat product. Any one of a number of varieties of forms can be duplicated in accordance with the present invention imitating choice cuts of meat such as hams, beef steaks, chicken breasts, fish fillets, etc.

The invention will now be more fully understood by reference to the accompanying examples of processing conditions for the preparation of the fibers of the present invention.

Example I 600 grams of casein were slurried in a large Waring Blendor with 1800 cc. room temperature tap water. This slurry was then placed in a hot water bath of 55° C. and agitated with slow stirring while 120 cc. of 5% sodium hydroxide solution was added. After holding the slurry for thirty minutes with gentle agitation it has a pH in the range of 5.3–5.8.

A slurry of 600 grams of finely ground to a size passing a 200 mesh screen de-fatted soy bean meal and 1800 grams of tap water at room temperature was produced by blending in a large Waring Blendor. The slurry was placed in a water bath at 55° C. with slow agitation and 500 cc. of 5% sodium hydroxide solution was slowly added to bring the pH to between 11 and 11.5, the slurry was stirred for at least thirty minutes at 55° C.

The soy slurry or dispersion was gradually added to the casein slurry or dispersion with continuous slow agitation to avoid mixing air into the spinning dough produced by such addition. Stirring was continued for one hour at 55° C. To improve the spinnability and strength of the dough thus produced it was held at a temperature of 5° centigrade for twelve hours to permit aging and slow de-aeration, during which time the soy and casein became fully hydrated, and entrapped air permitted to rise to the surface.

The dope was brought back to a temperature of 55° C. with agitation and 120 grams of melted hydrogenated cottonseed oil having a melting range of 30°–50° C. was added for purposes of improving the spinnability of the dough as well as enhancing the texture of the final product. Blending was continued for thirty minutes at 55° C. with slow agitation and the blend of dough and oil had a total solids content ranging from 23–25%.

The blended spinning dope held at 35–45° C. is extruded into filament through a 100 hole .015" diameter spinnerette and dropped into a coagulating bath containing 8 liters of water at room temperature having 520 cc. 85% lactic acid and 960 g. table salt (sodium chloride) to produce the protein fibers of this invention.

The fibers pass through the coagulating bath into a rinse bath containing 7 liters of H₂O and 420 g. of table salt. The fibers are held and stored in 4% table salt solution at 5° C.

When it is desired to utilize the fibers in a meat-like product, the fibers are brought to room temperature and excess salt solution removed by squeezing the fibers, to obtain fibers of approximately 35% total solids.

The fibers are dipped into a binder solution prepared by emulsifying 200 g. water, 70 g. egg albumen (dried), 100 g. hydrogenated cottonseed oil and flavor to suit (e.g., chicken flavor). The ratio of binder to wet fiber is approximately 1:1.2. The fiber-binder mix is heated in a covered pan for 45 minutes at 85–95° C. The resulting product has the cohesiveness, texture, and mouthfeel of chicken meat. It can be cut into chunks and dehydrated in a vacuum drier to 90–94% total solids.

The resulting dry chunks can be readily rehydrated in boiling water or in hot meat sauces, gravies or soup to yield chunks having the appearance, texture and mouthfeel of meat.

The protein product before dehydration or after dehydration and rehydration can be immersed in frying oils or fats at temperatures of 375–450° F. to yield crisp browned outer skins with fibrous inner centers resembling the texture and mouthfeel of fried fish or fried chicken.

Example II

To 160 g. casein in 600 cc. H₂O was gradually added 100 cc. 10% NaOH; the viscous dope was stirred at 55° C. for ½ hour. 240 g. soyflour in 500 cc. of water was added to the casein dispersion and the mixture stirred at 55° C. for ½ hour. 60 g. of hydrogenated cottonseed oil was added and the spinning dope held at 5° C. overnight. The spinning dope was brought to room temperature and extruded into a lactic acid bath as described in Example I; after rinsing the fibers in 4% salt solution and squeezing, the fibers were immersed in the binder mixture as described in Example I. The binder-fiber mixture was heated as previously described. The product had the appearance, texture and mouthfeel of meat but was drier in mouthfeel than the product prepared in Example I.

Example III

To 456 g. of acid precipitated casein wet curd containing 192 g. casein was added 390 cc. of water and 50 cc. of 10% NaOH with slow agitation to obtain a smooth casein spinning dope.

The dope was extruded into a lactic acid coagulating bath, the fibers rinsed free of residual lactic acid, squeezed and immersed into binder solution as in Examples I and II. On heating in oven at 85–90° C. for 45 minutes the fiber-binder mixture first fused due to the coagulation of the egg albumen in the binder. On additional heating to 95–100° C. for 5 minutes there was a noticeable loss of fiber strength, and a complete loss of fibrous texture after 10 minutes' heating indicating that casein fibers prepared without the addition of soyflour had none of the thermal stability as shown in Examples I and II.

While the present invention has been described with particular reference to specific examples, it is not to be limited thereby, but reference is to be had to the appended claims for a definition of its scope.

What is claimed is:

1. In the art of producing fibrous meat-like food products from proteins, the improvement in producing an edible protein fiber which comprises: preparing a protein fiber-spinning dope by blending a casein dope moiety and a soy bean meal dope moiety containing substantially undenatured soy protein, said casein dope moiety having a pH before blending in the acid range and substantially below its pH of optimal spinnability, said soy bean meal moiety having an alkaline pH before blending of sufficient alkalinity and amount to digest the protein in said soy bean meal and provide upon blending of said moieties a fiber-spinning dope having an optimal spinning pH; spinning said dope into discrete filaments; and precipitating said filaments to produce an edible protein fiber.

2. In the art of producing fibrous meat-like food products from proteins, the improvement in producing an edible protein fiber which comprises: preparing a protein fiber-spinning dope by blending a casein dope moiety and a soy bean meal dope moiety containing substantially undenatured soy protein, said casein dope moiety having a pH before blending below 5.8, said soy bean meal moiety having an alkaline pH before blending above 11.0 wherein the protein in said soy bean meal is digested, the amounts of said moieties being sufficient to provide upon blending of said moieties a fiber-spinning dope having an optimal spinning pH; spinning said dope into discrete filaments; and acid precipitating said filaments to produce an edible protein fiber.

3. In the art of producing fibrous meat-like food products from proteins, the improvement in producing an edible protein fiber which comprises: preparing a protein fiber-spinning dope by blending a casein dope moiety and a soy bean meal dope moiety containing substantially undenatured soy protein, the ratio of soy to casein dope moieties ranging between 40:60 and 60:40 parts by weight, said casein dope moiety having a pH before blending in the acid range and substantially below its pH of optimal spinnability, said soy bean meal moiety having an alkaline pH before blending of sufficient alkalinity to digest the protein in said soy bean meal and provide upon blending of said moieties a fiber-spinning dope having an optimal spinning pH; spinning said dope into discrete filaments; and acid precipitating said filaments to produce an edible protein fiber.

4. In the art of producing fibrous meat-like food products from proteins, the improvement in producing an edible protein fiber which comprises: preparing a protein fiber-spinning dope by blending a casein dope moiety and a soy bean meal dope moiety containing substantially undenatured soy protein, said casein dope moiety having a pH before blending below 5.8, said soy bean meal moiety having an alkaline pH before blending above 11.0 wherein the protein in said soy bean meal is digested, the amounts of said moieties being sufficient to provide upon blending of said moieties a fiber-spinning dope having an optimal spinning pH between 8.5–9.3; spinning said dope into discrete filaments; and acid precipitating said filaments to produce an edible protein fiber.

5. In the art of producing fibrous meat-like food products from proteins, the improvement in producing an edible protein fiber which comprises: preparing a protein fiber-spinning dope by blending a casein dope moiety and a soy bean meal dope moiety containing substantially undenatured soy protein, said casein dope moiety having a pH before blending in the range of 5.3–5.8, said soy bean meal moiety having an alkaline pH before blending of 11.0—11.5 wherein the protein in said soy bean meal is digested, the amounts of said moieties being sufficient to provide upon blending of said moieties a fiber-spinning dope having an optimal spinning pH between 8.5–9.3; spinning said dope into discrete filaments; and acid precipitating said filaments to produce an edible protein fiber.

6. In the art of producing fibrous meat-like food products from proteins, the improvement in producing an edible protein fiber which comprises: preparing a protein fiber-spinning dope by blending a casein dope moiety and a soy bean meal dope moiety containing substantially undenatured soy protein, the ratio of soy to casein dope moieties ranging between 40:60 and 60:40 parts by weight, said casein dope moiety having a pH before blending in the range of 5.3–5.8, said soy bean meal moiety having an alkaline pH before blending of 11.0–11.5 wherein the protein in said soy bean meal is digested, the latter pH being sufficient to provide upon blending of said moieties a fiber-spinning dope having an optimal spinning pH between 8.5–9.3; spinning said dope into discrete filaments; and acid precipitating said filaments to produce an edible protein fiber.

7. An edible protein fiber produced according to the method of claim 1.

References Cited in the file of this patent

UNITED STATES PATENTS

| | | |
|---|---|---|
| 2,813,794 | Anson et al. | Nov. 19, 1957 |
| 2,830,902 | Anson et al. | Apr. 15, 1958 |
| 2,833,651 | Anson et al. | May 6, 1958 |